United States Patent Office 2,752,295
Patented June 26, 1956

2,752,295

AZEOTROPIC SEPARATION OF VINYLTOLUENE FROM ETHYLTOLUENE

William F. Yates and Pennell C. Kelly, Texas City, Tex., assignors to Monsanto Chemical Company, St. Louis, Mo., a corporation of Delaware No Drawing. Application May 17, 1952,
Serial No. 288,528

7 Claims. (Cl. 202—42)

This invention relates to the purification of vinyltoluene and more specifically to the separation of vinyltoluene from crude mixtures of ethyltoluene and vinyltoluene.

The constantly growing demand for plastics and synthetic resins, particularly rubbers, has provided impetus to the search for chemical compounds which can serve as substitutes for or improvements over those presently used in polymer and synthetic rubber formulations. Vinyltoluene, obtained from alkylation of toluene with ethylene and subsequent dehydrogenation of the ethyltoluene product, is admirably suited for employment in this art both because of its unsaturated character and its ability to polymerize readily. For such applications, however, producion of vinyltoluene of high purity (95–99%) is required. One of the major problems in the production of vinyltoluene of the requisite high purity is the separation of this vinyl aromatic compound from its precursor, ethyltoluene. Ordinary fractional distillation methods are not satisfactory because of the proximity of boiling points of the two compounds and the polymerizable nature of the desired product. Elaborate and expensive equipment is required to give only low yields of high-purity vinyltoluene.

It is an object of this invention, therefore, to provide a process for the recovery of pure vinyltoluene from crude mixtures containing the same with a minimum of difficulty and with minimum loss due to polymerization of the vinyltoluene product itself.

It is a further object of this invention, to provide a process for the recovery by distillation of vinyltoluene of nearly 100% purity from mixtures containing substantially vinyltoluene and ethyltoluene.

It is a still further object of this invention to provide a method for the recovery of substantially pure vinyltoluene from mixtures of vinyltoluene and ethyltoluene by the azeotropic distillation of ethyltoluene from the mixture.

Further objects of this invention will become apparent from the description which follows.

It has now been discovered that vinyltoluene can be separated from a mixture of vinyltoluene and ethyltoluene by an azeotropic distillation using diacetone alcohol as the azeotrope former and substantially pure vinyltoluene recovered with little loss due to the polymerization of vinyltoluene. According to this invention, therefore, diacetone alcohol is added to a mixture containing vinyltoluene and ethyltoluene and an azeotrope of diacetone alcohol and ethyltoluene distilled therefrom. Substantially pure vinyltoluene can then be recovered from the still. The following examples will serve to illustrate, but not to limit, the novel process of this invention.

*Example 1*

Diacetone alcohol was added in equal volume to a dehydrogenated ethyltoluene mixture (approximately 35% vinyltoluene—65% ethyltoluene) containing about 0.2% sulfur as a polymerization inhibitor and about 70 cc. of this 1:1 mixture was charged to the still of a fractionating column having approximately 25 theoretical plates. After the column had reached equilibrium (1½ hours on total reflux), the feed was introduced continuously at a point between the stripping and rectifying sections at a rate of about 0.3 lb./hr. while the ethyltoluene-diacetone alcohol azeotrope was continuously removed overhead and the vinyltoluene fraction was continuously withdrawn from the bottom of the column. Column pressure was maintained at about 20 mm. of Hg and the reflux ratio employed was 4:1. The temperature of the boiling material never exceeded 80° C. Samples of the overhead and bottoms were taken periodically, washed free of diacetone alcohol, and analyzed by refractive index. Purity of the vinyltoluene produced was 98.5% and 99% of the vinyltoluene fed was recovered as this high-purity material. Losses due to polymerization were negligible.

*Example 2*

A 1:1 volume mixture of diacetone alcohol and dehydrogenated ethyltoluene mixture (40% vinyltoluene—60% ethyltoluene) was distilled exactly as described in Example 1 except that the reflux ratio was increased to 5:1. Data indicated that 95% of the vinyltoluene fed was recovered as vinyltoluene of 99.0% concentration. No evidences of polymer formation were observed.

*Example 3*

For the purpose of comparison, a similar dehydrogenated mixture (38% vinyltoluene—62% ethyltoluene) was distilled at a pressure below 20 mm. Hg absolute in the same column employed in Example 1 but without the addition of the diacetone alcohol as an azeotrope former. In this instance, the vinyltoluene obtained was only 96.2% pure and only 82.6% of the vinyltoluene fed was recovered in this concentration. Approximately 10% of the loss was due to polymerization of the vinyltoluene during distillation.

While the preceding examples have illustrated specific embodiments of this invention, it will be obvious to those skilled in the art that substantial variations are possible without departing from the scope of this invention. For example, in the preferred embodiment in this invention, diacetone alcohol is added to the charge in an amount equal to that required to form an azeotrope with substantially all of the ethyltoluene. However, the amount to be added is not to be considered as limited to this quantity. It has been determined that diacetone alcohol forms an azeotrope with vinyltoluene as well as with ethyltoluene and hence the separation can be achieved with less or more than the amount indicated as preferable. The use of an excess of the azeotrope former while it will decrease the number of plates required to make the separation, will also lower the yield of vinyltoluene in the bottom stream and will, of course, necessitate further treatment of this stream for separation of the vinyltoluene from the azeotropic mixture of the latter with diacetone alcohol. Less than the preferred amount may be employed if additional plates are provided in the column to make the separation. Regardless of variations in the amount of azeotrope former employed, the yield of substantially pure vinyltoluene obtained by the use of this azeotropic distillation with diacetone alcohol far exceeds that realized by ordinary distillation techniques.

The preferred amount of diacetone alcohol to be added to the charge to be distilled may be readily calculated from the amount of ethyltoluene in the charge and the composition of the diacetone alcohol-ethyltoluene azeotrope at a specified pressure. For example, at 20 mm. Hg absolute pressure, the minimum boiling azeotropic mixture as determined experimentally contains about 75% ethyltoluene.

At elevated temperatures, vinyltoluene polymerizes readily. In order to control or prevent loss of vinyltoluene by polymerization, it is desirable that a polymerization inhibitor be added to the charge to be distilled. While many of the commonly used inhibitors, such as tertiary butyl catechol, hydroquinone, phenol, etc., may be employed in the novel process of this invention, sulfur has been found to be particularly effective in this process as a polymerization inhibitor. It is to be understood, however, that the novel process of this invention results in higher yields of substantially pure vinyltoluene when carried out in the absence of a polymerization inhibitor when compared with ordinary distillation techniques carried out in the absence of a polymerization inhibitor.

In this connection, it has also been found to be desirable to conduct the distillation at subatmospheric pressures to insure that the temperature of the mixture is kept below that point at which significant polymerization occurs. Temperatures below about 100° C. have been found to be particularly applicable and use of pressures below 20 mm. Hg absolute will result in pot temperatures below about 100° C.

This invention is not related to any specific combination of isomers but is applicable in the separation of any of the possible isomeric mixtures of ethyltoluene and vinyltoluene from each other.

Diacetone alcohol is particularly effective as an azeotrope former not only because it is a polar, oxygenated organic compound which boils in the required range, but because it is readily water-soluble, is miscible with ethyltoluene-vinyltoluene mixtures, and does not react chemically with either of these compounds. Its ready separability from the azeotropic mixture after the azeotrope has been separated from vinyltoluene is an especially desirable feature since it permits reuse of the azeotrope former for purification of more crude vinyltoluene and provides ethyltoluene for recycle to the dehydrogenation process to produce more vinyltoluene. The diacetone alcohol may be recovered from ethyltoluene by simple extraction techniques employing water as the extracting agent. The azeotrope former may then be separated from the water extract by a simple distillation at a pressure at which the diacetone alcohol does not form an azeotrope with water.

It is obvious from the foregoing description that the process of this invention is a simple, straightforward, and efficient one. No expensive or elaborate equipment is required. In fact, the use of this continuous process of azeotropic distillation with diacetone alcohol will materially reduce the number of theoretical plates required for any given fractionating column to separate ethyltoluene from vinyltoluene. Higher yields of purer vinyltoluene are secured by this process than are possible with conventional distillation techniques. The ease with which the azeotrope former can be recovered from the azeotropic mixture provides for ready recovery and reuse of both the azeotrope former and the ethyltoluene.

What is claimed is:

1. In a process for the separation of vinyltoluene from a crude mixture containing vinyltoluene and ethyltoluene, the step which comprises adding diacetone alcohol to said mixture and subjecting the resulting mixture to distillation at a pressure below about 20 mm. Hg absolute and a temperature below about 100° C. in the presence of a polymerization inhibitor to remove the diacetone alcohol-ethyltoluene azeotrope formed.

2. In a process for the separation of vinyltoluene from a crude mixture containing vinyltoluene and ethyltoluene, the step which comprises adding diacetone alcohol to said mixture in an amount approximately equal to that required to form an azeotrope with substantially all the ethyltoluene and subjecting the resultant mixture to distillation at a pressure below about 20 mm. Hg absolute and a temperature below about 100° C. to remove the diacetone alcohol-ethyltoluene azeotrope formed.

3. In a process for the separation of vinyltoluene from a crude mixture containing vinyltoluene and ethyltoluene, the step which comprises adding diacetone alcohol to said mixture in an amount approximately equal to that required to form an azeotrope with substantially all the ethyltoluene and subjecting the resultant mixture to distillation at a pressure below about 20 mm. Hg absolute and a temperature below about 100° C. in the presence of a polymerization inhibitor to remove the diacetone alcohol-ethyltoluene azeotrope formed.

4. A process as described in claim 3 wherein the polymerization inhibitor is sulfur.

5. A process for the separation of vinyltoluene from a crude mixture containing vinyltoluene and ethyltoluene which comprises continuously adding diacetone alcohol to said mixture in an amount approximately equal to that required to form an azeotrope with substantially all the ethyltoluene, subjecting the resultant mixture to distillation at a pressure below about 20 mm. Hg absolute and a temperature below about 100° C. in the presence of a polymerization inhibitor to continuously remove the diacetone alcohol-ethyltoluene azeotrope formed, and continuously recovering vinyltoluene substantially free of ethyltoluene.

6. A process as described in claim 5 wherein the polymerization inhibitor is sulfur.

7. A process for the separation of vinyltoluene from a crude mixture containing vinyltoluene and ethyltoluene which comprises adding diacetone alcohol to said mixture in an amount approximately equal to that required to form an azeotrope with substantially all the ethyltoluene, subjecting the resultant mixture to distillation at a pressure below about 20 mm. Hg absolute and a temperature below about 100° C. in the presence of a polymerization inhibitor to remove the diacetone alcohol-ethyltoluene azeotrope formed, recovering vinyltoluene substantially free of ethyltoluene, extracting the diacetone alcohol-ethyltoluene azeotrope with water, recovering ethyltoluene by separation, and distilling the water extract to recover substantially pure diacetone alcohol.

References Cited in the file of this patent

UNITED STATES PATENTS

| | | |
|---|---|---|
| 2,442,229 | Berg et al. | May 25, 1948 |
| 2,531,327 | Elwell | Nov. 21, 1950 |

OTHER REFERENCES

Journal of Research of the National Bureau of Standards, vol 27, No. 1, July 1941, 202/42L (only pp. 49 and 50 relied upon).

Industrial and Engineering Chemistry, vol 36, No. 10, 1944 (pp. 871–875).